United States Patent [19]

Wattier

[11] Patent Number: 4,512,056

[45] Date of Patent: Apr. 23, 1985

[54] WINDSCREEN WIPER SYSTEM

[75] Inventor: Maurice F. Wattier, Sissonnes, France

[73] Assignee: Equipements Automobiles Marchal, Issy-les-Moulineaux, France

[21] Appl. No.: 583,400

[22] Filed: Feb. 24, 1984

[30] Foreign Application Priority Data

Feb. 25, 1983 [FR] France ................ 83 03149

[51] Int. Cl.³ .............................. B60S 1/24
[52] U.S. Cl. ................................ 15/250.23
[58] Field of Search ............ 15/250.13, 250.21, 250.23

[56] References Cited

U.S. PATENT DOCUMENTS 3,428,995 2/1969 Pollock ........................... 15/250.23
3,831,221 8/1974 Gmeiner ........................ 15/250.21

FOREIGN PATENT DOCUMENTS 1561395 3/1969 France ............................ 15/250.23
1381818 1/1975 United Kingdom ............ 15/250.23

Primary Examiner—Peter Feldman
Attorney, Agent, or Firm—Walter Kruger

[57] ABSTRACT

A windscreen wiper drive linkage has a wiper blade mounted on the end of a blade arm by means of a pivotal connector allowing shifting of the position of the blade relative to the end of the arm in a radial direction relative to the center of rotation of the arm. Such radial shifting of the blade is actuated by a second arm pivoted at one end of the blade-carrying connector and at the other end to an actuating crank which is driven by a pivotal arm linkage from a drive crank to the main blade arm. As the drive crank rotates in a to-and-fro manner the linkage, comprising two reversing links pivotally attached to an idler, drives the actuating crank for rotation to displace the blade radially relative to the center of rotation of the blade arm.

19 Claims, 10 Drawing Figures

WINDSCREEN WIPER SYSTEM

FIELD OF THE INVENTION

The present invention concerns a windscreen wiper system intended in particular for motor vehicles; it concerns more particularly the driving mechanism associated with a windscreen wiper system wherein at least one windscreen wiper blade is displaced radially relative to a blade holder arm in the course of alternating angular movements of the blade holder arm so as to modify the surface wiped by the blade on the windscreen.

PRIOR ART

Belgian Patent application No. 890,467 describes a windscreen wiper system of this type wherein at least one blade is articulated on an intermediary connecting element which itself is articulated on the end of a blade holder arm to allow the blade to be displaced in relation to the arm in a plane perpendicular to the windscreen; i.e. radially of the rotation axis of the arm; the blade is driven in an alternating wiping motion by the blade holder arm; this blade holder arm is fixed, for rotation in relation to the vehicle body, to a first shaft driven in alternating rotation around a first axis by the alternating swivel movements of a driving crank around this first axis; the said driving crank is displaced by a driving link on which the driving crank is articulated, the said driving link being connected to the output shaft of a driving motor via a further crank; the displacements of the blade-carrying intermediary connecting element in relation to the blade holder arm are actuated by a separate actuator arm articulated to the intermediary connecting element and to a special actuator crank for the connecting element, this actuator crank itself being fixed to a second rotatable shaft which is driven to rotate around a second axis by the motion of the driving crank so that any one of the points of the blade follows a non-circular trajectory.

The system proposed in the above-mentioned application thus comprises two kinematic chains having at least one common element:

a first kinematic chain is constituted by the first shaft mounted for rotation around the first axis fixed in relation to the body, by the blade holder arm which is fixed for rotation to this first shaft, and by the intermediary connecting element articulated on the one hand to the blade holder arm and on the other hand, to the blade; the set of the elements of this first kinematic chain is completely contained in a plane which contains the first axis, or is parallel to the first axis, and is endowed with an oscillating motion through the agency of the first shaft, which constitutes the input element of this first kinematic chain; the input motion is transmitted from the motor via a first transmission comprising the driving crank and the driving link;

a second kinematic chain comprises, on the one hand, the intermediary connecting element as well as the actuator arm of this element articulated to the latter, on the other hand the actuator crank of the actuator arm articulated to the said arm, and finally, the second shaft swivel mounted around the second axis and whereto the actuator crank mentioned above is fixed for rotation; the second shaft constitutes the input element of the second kinematic chain and receives its input motion via a second transmission connected to the first.

In such a system, it is known that the function of the first kinematic chain is to govern at any moment, the angular position of the blade whilst that of the second chain is to constrain a given point of the blade to describe a trajectory which diverges from the circular arc conventionally obtained in the case in point where the blade wipes a planar windscreen, disposed perpendicularly to the first shaft and parallel to the blade holder arm.

OBJECTS OF THE INVENTION

Whilst preserving the inherent advantages of systems of this kind it is proposed, in the present invention to simplify the manufacture whilst further improving the operating conditions of systems of this type. These advantages are:

(1) a satisfactory guidance of the blade favourable to the wiping action and not impairing the driver's visibility, on the one hand by reason of the articulation of the blade on the connecting element which is itself articulated on two arms of which at least one swivels directly on the body, and on the other hand by reason of the small dimensions which can be given to the connecting element so that the actuator arm of this element moves but little from the blade holder arm.

(2) A consequent increase in the surface wiped by reason of the considerable divergence given to the blade in relation to the conventional circular trajectory.

(3) A small mass of the elements of the system producing this divergenc of the blade and hence the absence of undue inertial stress at high wiping speeds.

SUMMARY OF THE INVENTION

For this purpose, the windscreen wiper system in accordance with the invention, of the type presented above, is characterised in that the second shaft is caused to rotate by swivelling around the second axis of a driven crank fixed for rotation to the second shaft; this driven crank is articulated at one point on a first reversing bar which is articulated, moreover, at a point on an idler constrained to a circular or rectilinear motion and whereon a second reversing bar is articulated at one point, this second reversing bar being also articulated at one point on the driving crank. In this way, the projection in a plane passing through the blade holder arm and perpendicular to the windscreen, of the displacements of the actuator arm of the connecting element is a translation in relation to the blade holder arm. The driving of the actuator arm of the connecting element from the driving motion of the blade holder arm by a link-crank system, provides great flexibility of use and proves to be simplified in operation and far less noisy than gearwheel systems, especially as is here the case, when one is concerned with an alternating motion.

The first and second reversing links may be articulated on the idler at the same point but it is also possible that the articulating points of the first and second reversing links on the idler respectively, should be different points.

In this second case, these points may describe circular arc trajectories having the same centre and the same radius which may be infinite, but according to a variant it is also possible that these points of articulation describe circular arc trajectories having the same centre but different radii of finite values.

In this latter case, and in accordance with a preferred mode of embodiment, the idler is constrained into a circular motion with a finite radius around a centre of rotation and the points of articulation of the first and second reversing link respectively on the idler and the centre of rotation of the idler are aligned.

Preferably, the first and second axes are parallel which facilitates the making of the articulations, in particular of the articulations of the first and second reversing links respectively on the driven crank, on the driving crank and on the idler, as well as of the actuator arm for the intermediary connecting element on the actuator crank for this connecting element.

However, in a particularly advantageous embodiment, the first and second axes are identical and the second shaft is a sleeve traversed coaxially by the first shaft which has the advantage of facilitating the mounting of the system on the vehicle and of improving the appearance.

Moreover, if the articulating points of the first and second reversing links respectively on the driven crank and on the driving crank are situated on either side of the plane passing through the common axis of rotation of the two shafts and through the centre point between the points of articulation of the two reversing links on the idler, the effect is obtained, according to a specific characteristic to the invention, that the swivel motions of the driving crank and those of the driven crank are in opposite directions, which secures a better dynamic balance for the system as a whole and moreover allows, for a given angle of swivel, a large relative displacement of the actuator arm for the intermediary connecting element in relation to the windscreen wiper arm.

Also advantageously, the distance separating the common axis of rotation of the two shafts from the points of articulation of the first reversing link on the driven crank is equal to the distance separating this same common axis from the articulation point of the second reversing link on the driving crank. Similarly, the distance separating the points of articulation of the first reversing link on the driven crank and on the idler respectively, is equal to the distance separating the points of articulation of the second reversing link on the driving crank and on the idler respectively so that the angle of the range of movement of the actuator crank for the intermediary connecting element which equals the angle of the range of movement of the driven crank is equal to the angle swept by the blade holder arm (and also to that wiped by the blade) which is itself equal to the angle of the movement range of the driving crank. This embodiment, which is mechanically simple, has the advantage that the angular accelerations sustained by the driven crank and the actuator crank for the connecting element are the same as those sustained by the driving crank, which facilitates a determination of the strength which these elements must have and therefore makes it possible to calculate their dimensions in better conditions.

If, moreover, the distance separating the points of articulation of the second reversing link on the idler and on the driving crank respectively is equal to the distance separating the common axis of the centre of rotation around which the idler is constrained into a circular motion, the idler, the second reversing link and the driving crank are rearranged along a deformable parallelogram so that these three elements, articulated two by two, are displaced in conditions which as far as possible avoid any jamming conditions and which are substantially the same at the two ends of travel of each one of these three elements.

If, moreover, the two reversing links are articulated at the same point on the idler, it is advantageous for the distance separating the points of articulation of the second reversing link on the idler and on the driving crank respectively, to be equal to the product of the distance separating the common axis from the point of articulation of this second reversing link on the driving crank multiplied by 2 cos $\theta/2$ where $\theta$ is the wiping angle of the blade. This embodiment ensures that good conditions of relative displacement and closely related angular accelerations are obtained at the end of travel of the elements articulated two by two on each other, that is to say, the driven crank, the first reversing link, the idler, the second reversing link as well as the driving crank.

On the other hand, when the two reversing links are articulated at two different points on the idler, in order to obtain similar conditions relating to the relative displacements and to the angular velocities at the level of the end positions of the angular movement range, the product of the distance separating the common axis from the point of articulation of the second reversing link on the driving crank multiplied by 2 cos $\theta/2$ where $\theta$ is the angle of sweep of the blade, must be equal to the product of the distance separating the two points of articulation of the second reversing link on the idler and on the driving crank respectively multiplied by sin $\alpha$ where $\alpha$ is the angle delimited by the two segments joining the points of articulation of the first and of the second reversing links respectively on the idler at the centre of rotation of the latter.

It is, moreover, possible, according to the invention, to adapt the surface wiped to the geometry of the windscreen by an angular shift of the position of the actuator crank of the intermediary connecting element in relation to the driven crank, taking into account the angle of sweep of the blade holder arm. For this purpose, the actuator crank for the intermediary connecting element and the driven crank are mounted on the second shaft, for angular adjustment with respect to each other.

In a mode of embodiment distinguished by its simplicity of manufacture in the case where the two reversing links are simultaneously articulated to each other and to the idler around the same point, the idler is, moreover, articulated around a fixed point of the vehicle which constitutes the centre of the circular arc described by the common point of articulation of the reversing links and of the idler, the movements of the idler around the fixed point of the vehicle are actuated by the second reversing link. This embodiment has the advantage that it only requires two fixed points on the vehicle.

It has, however, been found that the position of the fixed point of articulation of the idler on the vehicle is unimportant for increasing the surface wiped by offsetting the blade. Nevertheless, the greater the distance separating this fixed point from the common point of articulation of the idler on the two reversing links the more the angular movements of these reversing bars approximate to each other. This is advantageous because the angular acceleration sustained by the reversing links also approximate to each other which facilitates the calculation of their dimensions.

Accordingly, it is particularly advantageous to have as long an idler as possible. But since the length of this element is necessarily limited for reasons of bulkiness, the invention also provides a system wherein the idler is guided in a slide fixed to the vehicle, which is either circular or rectilinear, the centre of the circular arcs described by the points of articulation of the two reversing links on the idler then being transferred, in this latter case to infinity.

BRIEF DESCRIPTION OF THE DRAWINGS

In order that the present invention may more readily be understood there will now be described, by way of an illustrative example, a mode of embodiment and variants represented in the accompanying drawings, in which.

DESCRIPTION OF THE PREFERRED EMBODIMENTS

In the description given below, it has, for the sake of convenience, been assumed that the windscreen wiped by the blade of the windscreen wiper is a plane windscreen. In practice the windscreen will normally be convex, as is well known.

Figure 1:
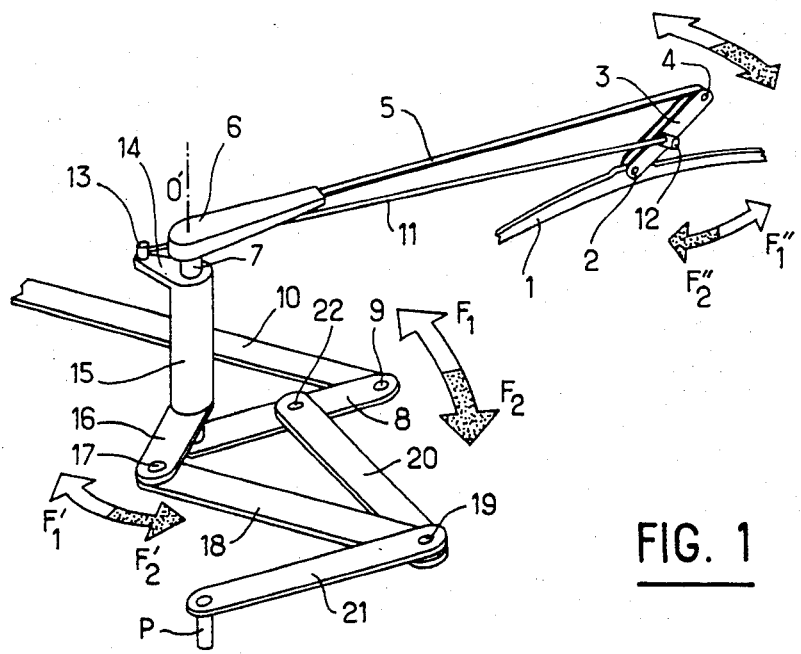
FIG. 1 is a schematic and part view in perspective of a windscreen wiper system comprising a single blade driven from a motor reducing gear assembly which is not shown.
Figure 2:
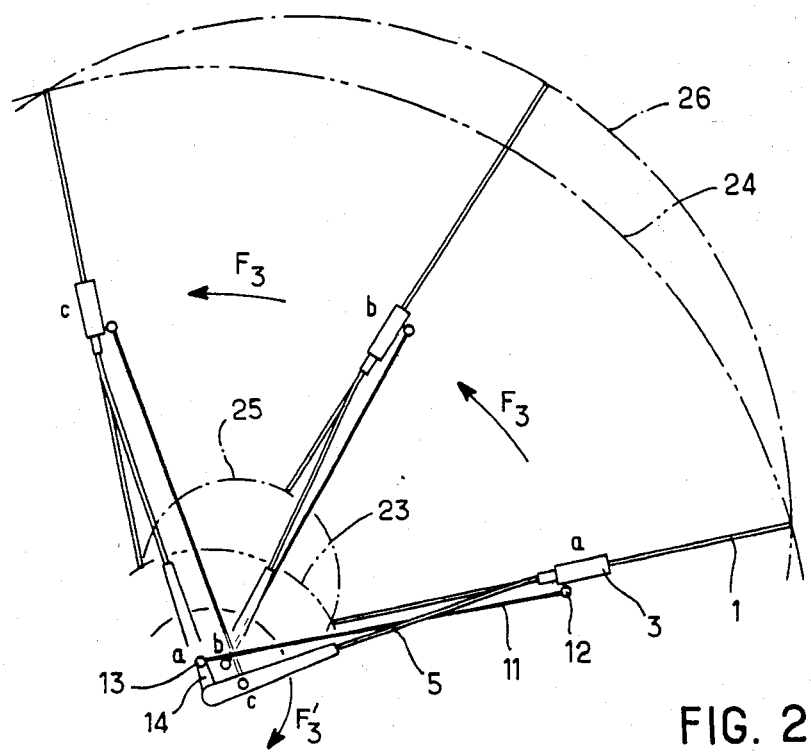
FIG. 2 is a view in a direction substantially perpendicular to the windscreen plane, of the system represented in FIG. 1 in three characteristic positions which it occupies during the wiping of this windscreen.

Referring to FIGS. 1 and 2, it will be seen that the system according to the invention comprises a blade 1 whose fitting is swivel-mounted in its central portion around a pin 2, parallel to the plane of the windscreen, on the lower end of a connecting element or rocker 3; the connecting element 3 is swivel-mounted at its upper end on a pin 4 parallel to pin 2, on the free end of a blade holder arm 5; arm 5 is fixed for rotation at its other end 6 on the top part of a blade holder shaft 7 mounted for rotation around a fixed axis 00' perpendicular to the windscreen. The lower part of the blade holder shaft 7 is fixed to the proximal end of a driving crank 8 whose distal end is articulated by a pin 9 on a driving link 10. The driving link 10 is driven for longitudinal reciprocation by a crank or a crank shaft (particularly if several blades are to be driven within the same system) mounted on the output shaft of a motor/reducing gear assembly, in a well known way; in this way, the continuous rotational motion of the motor of this assembly is transformed into an alternating rotational motion of blade 1 and of the blade holder arm 5, with an amplitude equal to that of the wiping action, through the intermediary of the alternating swivels or movements of the driving crank 8 driven by driving link 10 and driving the blade holder shaft 7.

Moreover, a second arm 11 is articulated at its distal end on rocker 3 by means of a universal joint 12, situated between the two pins 2 and 4 and at its other end also by means of a universal joint 13 on the free end of an actuator crank 14. The actuator crank 14 is fixedly carried by the upper portion of a sleeve 15 coaxially surrounding the blade holder shaft 7 and being also mounted for free rotation relative to the vehicle around the fixed axis 00'.

A driven crank 16 has one of its ends detachably fixed to, and adjustable at, the lower portion of sleeve 15 so that the angular position of the driven crank 16 around axis 00' in relation to that of the actuator crank 14 can be adjusted to the required angle, and so that crank 16 may then be secured in this position.

At its other end, the driven crank 16 is articulated at a pin 17 to one end of a first reversing link 18 whose other end is articulated by a pin 19, both to one end of a second reversing link 20 and to one end of an idler 21. The idler 21 is articulated at its other end on a fixed point of the vehicle, for example by being swivel-mounted around a fixed pin P parallel to the fixed axis 00'; the second reversing link 20 is articulated at its other end by a pin 22 to a fixed point situated in the central portion of the driving crank 8 so that the distance separating pin 22 from axis 00' should be equal to that separating the pin 17 from the same axis 00'. Moreover, this mounting is effected in such a way that the pin 22 and the pin 17 are situated on respective sides of the plane passing through both axis 00' and the pin 19 articulating the two reversing links 18 and 20 to each other and to the idler 21. Pins 9, 17, 19 and 22 are all parallel to axis 00'.

The distances separating the pin 19 from pins 17 and 22 are equal; when the driving crank 8 is driven by the driving link 10 in rotation through a certain angle around axis 00', as indicated by arrow $F_1$ on FIG. 1, the blade holder arm 5 and the blade are driven in rotation through the same angle around the same axis in the same direction; the reversing link 20 actuates rotation of idler 21 in the same direction around pin P which produces, thanks to the reversing link 18, driving of driven crank 16 in rotation around axis 00' through the same angle as the driving crank 8 but in the opposite direction as is indicated by arrow $F'_1$ on FIG. 1. This rotation in the opposite direction is transmitted by sleeve 15 to the actuator crank 14 and imparts to arm 11 a travel in relation to the blade holder arm 5. The projection of this travel of the second arm 11 in the plane passing through both the axis 00' and the blade holder arm 5 is substantially a translation which causes rocker 3 to tilt around pin 4 in the direction indicated by arrow $F''_1$ on FIG. 1. This has the effect of moving the blade 1 radially outwardly, from axis 00', relative to the blade holder arm 5. In the same way, when driving crank 8 is swivelling around axis 00' in the direction indicated by arrow $F_2$ on FIG. 1, the driven crank 16 is swivelling in the opposite direction around the same axis as indicated by arrow $F'_2$ and the blade is moved radially inwardly by a rotation of rocker 3 along arrow $F''_2$. The movements of the blade holder arm 5 and of the actuator arm 11 for rocker 3 thus operate in opposite directions.

By the selection of the angle defined between the driven crank 16 and the actuator crank 14 (more precisely, the angle of the dihedron defined by the planes passing on the one hand through axis 00' and, on the other hand, either through the centre of universal joint 13 for one of these two planes, or through the centre of pin 17 for the other of these two planes), it is possible to obtain a wiping action as represented in FIG. 2 wherein the wiped surface is symmetrical in relation to the bisector of the wiping angle.

In this FIG. 2, a and c designate the two extreme angular wiping positions and b the position wherein there occurs the maximum divergence of the blade in relation to the positions it occupies at (a) and (c) which are, in this case, identical. The circular arcs 23 and 24 indicate the lower and upper wiping limits which would be obtained without rocker 3; the arcs 25 and 26 indicate the corresponding wiping limits obtained with rocker 3, during sweeping from an extreme position (a) wherein the actuator crank 14 is practically perpendicular to the blade holder arm 5. The rotation of arm 5 and of blade 1 in the direction of arrow $F_3$ as far as the extreme position (c) while passing through the position (b) actuates the rotation of the actuator crank 14 and of rocker 3 in the opposite direction indicated by arrow $F'_3$ so that in position (b), along the bisector of the wiping angle, the actuator crank 14 is aligned with arm 5 and on the same side of the axis of rotation as the arm, which corresponds to the maximum radially outward displacement of blade 1; in position (c), the actuator crank 14 has again returned to the position perpendicular to blade holder arm 5, but on the other side from the latter with respect to their respective initial position at (a).

In relation to the loss in the surface wiped, defined between arcs 23 and 25 at the bottom of the windscreen, in a zone where it is not essential for the driver to have excellent visibility, there is a far greater increase in the surface wiped, defined between the two arcs 24 and 26, in a zone where it is desirable to have good visibility constantly at one's disposal, and this increase in the surface wiped may, in accordance with the invention, be distributed in the required way over the wiping angle. In effect, according to the angle chosen between the driven crank 15 and the actuator crank 14, the wiping action may be adjusted between that represented in FIG. 3 and that represented in FIG. 4.

Figure 3:
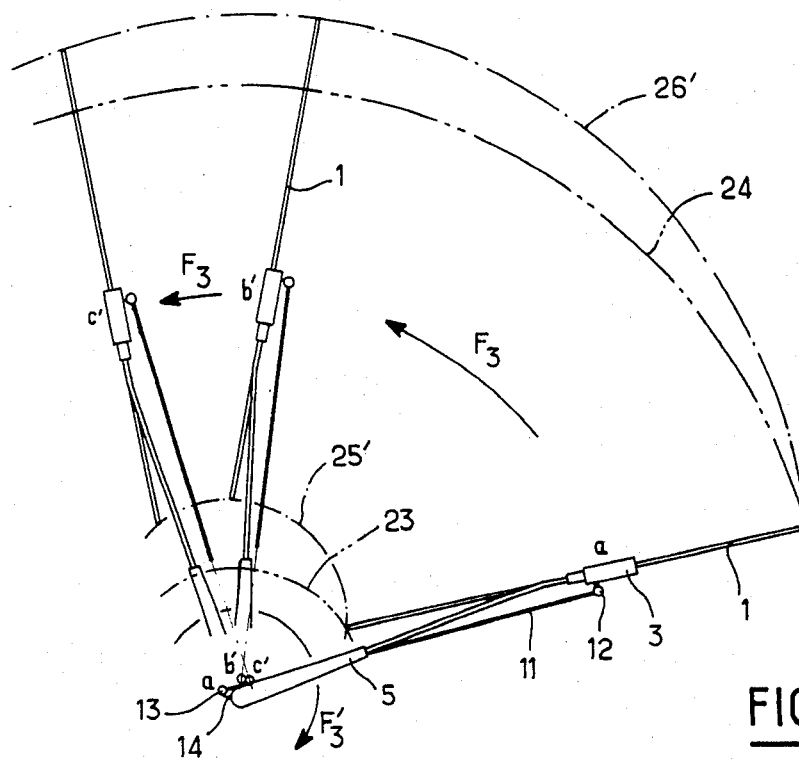
FIGS. 3 and 4 are views, analogous to FIG. 2, of systems according to FIG. 1, where the actuator crank of the connecting element has been given an angular shift allowing the systems to be adapted to the geometry of the windscreen.

In FIG. 3, the extreme position (a) has not altered in relation to the corresponding position of FIG. 2; on the other hand, the maximum divergence position (b') of blade 1 is no longer situated on the bisector of the wiping angle but has shifted towards the other extreme position (c'): this position (c') is different from the extreme position (a), because blade 1 has at (c') a certain divergence so that the circular arcs 23 and 24 are not intersected at position (c') by arcs 25' and 26' effectively traversed by the lower and upper ends of blade 1 respectively.

Figure 4:
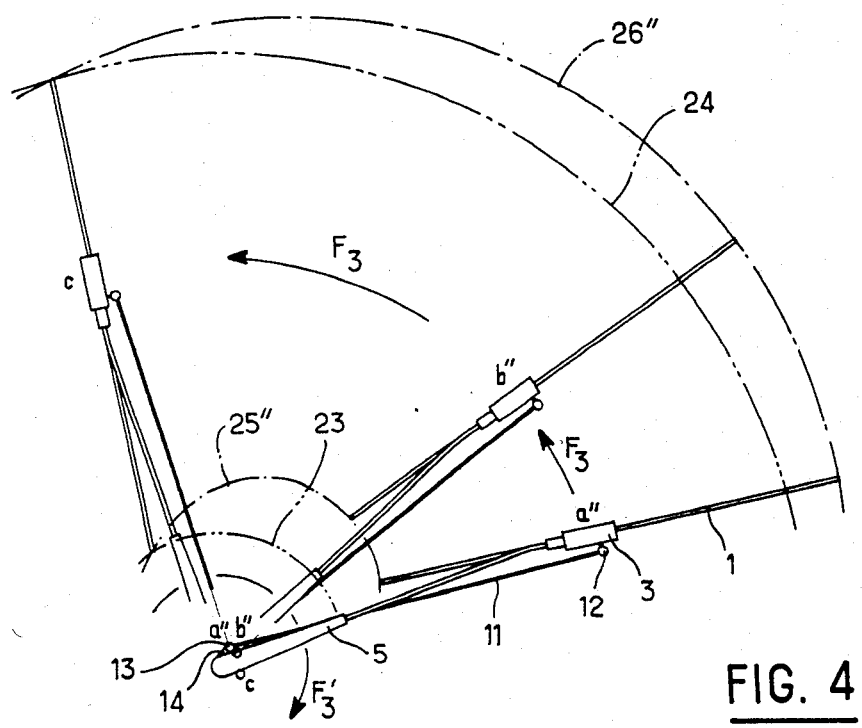

On the contrary, in FIG. 4, the extreme position (c) is the same as the corresponding extreme position in FIG. 2, but the maximum divergence position (b") of blade 1 is shifted in this case towards the extreme position (a") wherein blade 1 shows a certain divergence; in this position (a"), the circular arcs 23 and 24 are not intersected by arcs 25" and 26" effectively traversed by the lower and upper ends respectively of blade 1.

Such angular shifts of the actuator crank 14 in relation to the driven crank 16, taking into account the value of the wiping angle of the system, make it possible to adapt the wiped surface to the geometry of the windscreen. Moreover, it is also possible to reduce in this case the length of the actuator crank 14 for rocker 3 which is advantageous as far as appearance is concerned.

In the embodiment represented in FIG. 1, the distances separating the common axis 00' from the articulation pins 17 and 22 of the driven crank 16 on the first reversing link 18 and of the driving crank 8 on the second reversing link 20 respectively, are equal and that the distance separating the two articulation pins 17 and 19 of the first reversing link 18 is equal to the distance separating the two articulation pins 19 and 22 of the second reversing link 20. If, moreover, the distance between the two articulation pins 19 and 22 is equal to the distance separating the joint axis 00' from the fixed axis of rotation P of idler 21 on the vehicle, then the driving crank 8, the second reversing link 20, the idler 21, and the line joining axis 00' to the axis P, constitute a deformable parallelogram which has the advantage that during their angular movements, the above-mentioned three elements 8, 20, 21 avoid any jamming when passing through their two extreme positions. This facilitates the dimensioning of these elements and improves their fatigue strength in operation. The same applies as regards the three elements articulated two by two, that is to say, the idler 21, the first reversing link 18 and the driven crank 16, if the distance separating the pins 17 and 19 or the pins 19 and 22 is equal to the product of the distance separating axis 00' from pin 17 or 22 multiplied by $2 \cos \theta/2$, where $\theta$ is the wiping angle of blade 1, that is to say, also the angular range of movement of the driving crank 8. One then obtains, moreover, movements with similar angular velocities and accelerations for the driving crank 8, the reversing link 20 and idler 21, as well as for the driven crank 16 and the reversing link 18.

Figure 5:
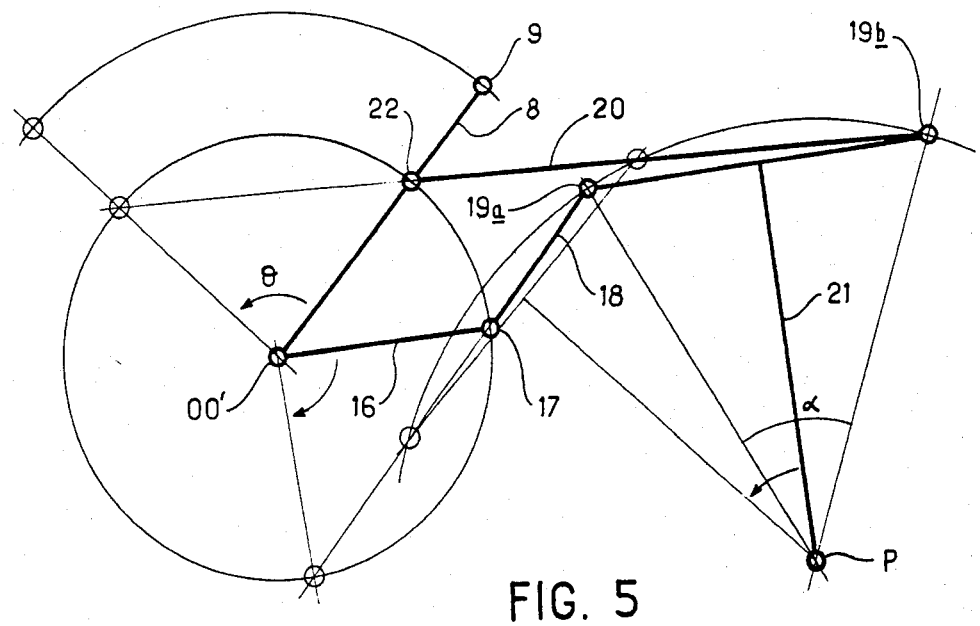
FIGS. 5 and 6 are schematic views in a direction substantially perpendicular to the plane of the windscreen, of two extreme positions of a first example of a system wherein the two reversing bars are articulated at two different points on the idler.
Figure 6:
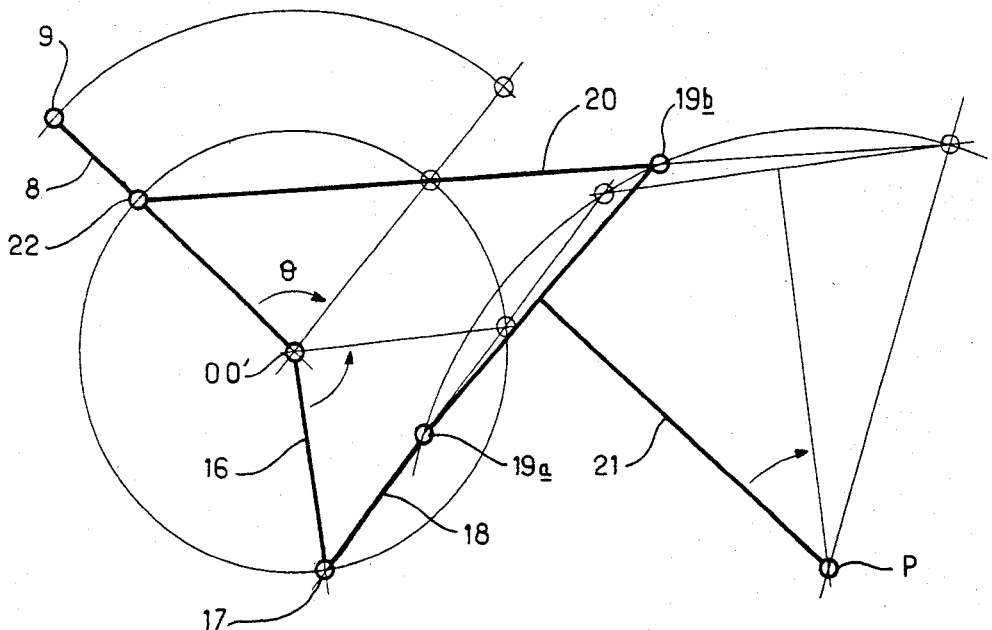

In FIGS. 5 and 6, there have been shown, facing the windscreen, the extreme positions for the right-hand and lefthand respectively, corresponding to the extreme positions (a) and (c) respectively of FIG. 1 of a schematic example of a windscreen wiper system whereon the two reversing links 18 and 20 are articulated by two distinct pins 19a and 19b on idler 21. For reasons of clarity, the driving link, the blade holder arm, the second arm, the actuator crank, the rocker and the blade have not been shown, but it is duly understood that these elements may be analogous to the corresponding elements of the embodiment represented in FIG. 1. The elements and pins represented in FIG. 5 and 6 which correspond to the elements and pins represented in FIG. 1 are marked by the same reference numbers.

In this example, the articulation pins 17 and 22 are situated on and are displaced on arcs of one and the same circle whose centre is on axis 00'. In the same way, the articulation pins 19a and 19b are situated on and are displaced on arcs of the same circle whose centre is on axis P. The positions of the articulation pins 17 and 19a as well as those of pins 19b and 22 in the extreme positions of travel of the reversing links 18 and 20, correspond to the points of intersection of these two circles with straight lines extending the reversing links 18 and 20.

In this example, idler 21 is T-shaped and articulated by the foot of its "vertical" bar at P on the vehicle and by the two ends of its "horizontal" bar at 19a and 19b on the two reversing links 18 and 20, but it is duly understood that this T-shaped idler may be replaced by an idler in the form of an isosceles triangle articulated substantially at its three corners P, 19a and 19b and be such that the side P 19a should be equal to the side P 19b or yet be an element of any other shape articulated at P on the vehicle and be such that the segments P 19a and P 19b should be equal.

Figure 7:
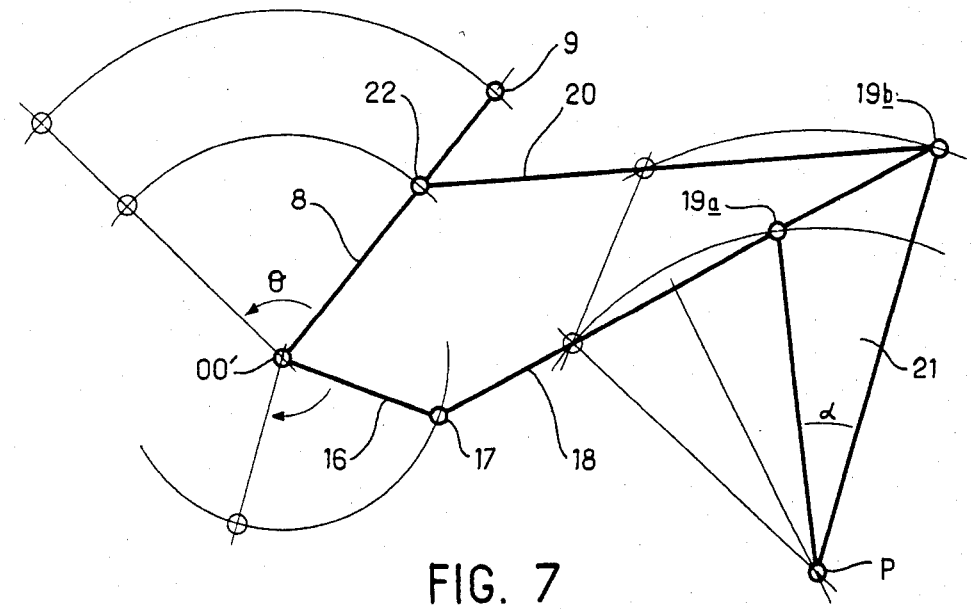
FIGS. 7 and 8 are two Figures analogous to FIGS. 5 and 6 for a second example of the system wherein the two reversing bars are articulated at two different points on the idler.
Figure 8:
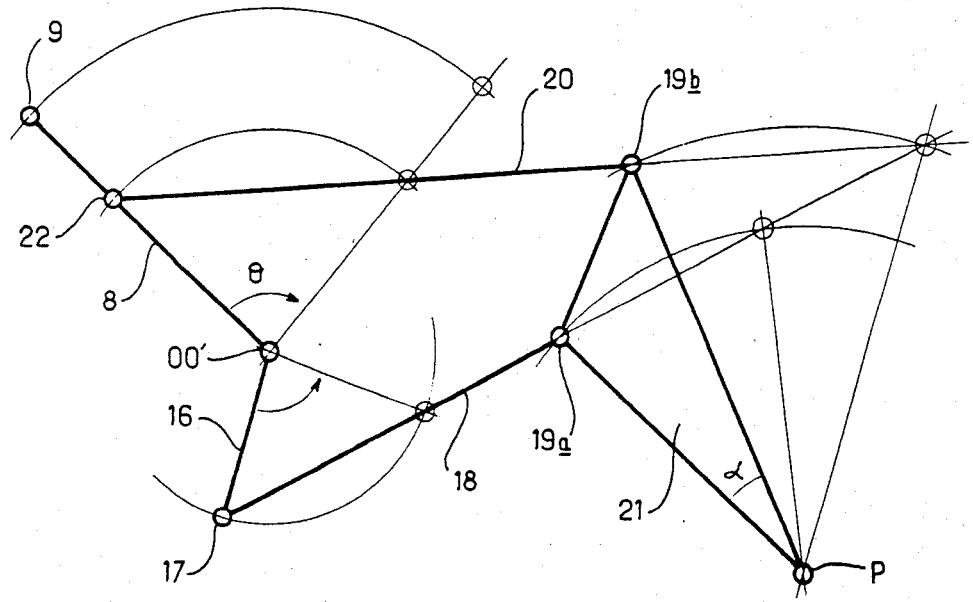

In FIGS. 7 and 8, there have been shown in an analogous manner, the two extreme positions of another example of an embodiment wherein the articulation pins 17 and 22 are displaced along two concentric circles with a centre situated at axis 00' but with different radii and wherein the two distinct articulation pins 19a and 19b wherewith the two reversing links 18 and 20 are articulated respectively to the triangular idler 21, are also displaced on two concentric circles whose centre is situated on the rotation axis P of the idler 21 on the vehicle but whose radii are different, the radius of the circle whereon pin 19a is displaced being smaller than the circle whereon pin 19b is displaced.

In this case too, the extreme positions of pins 17 and 19a on the one hand and of 19b and 22 on the other hand, are determined by the intersections of the two pairs of the above-mentioned concentric circles with straight lines extending the reversing links 18 and 20.

Figure 9:
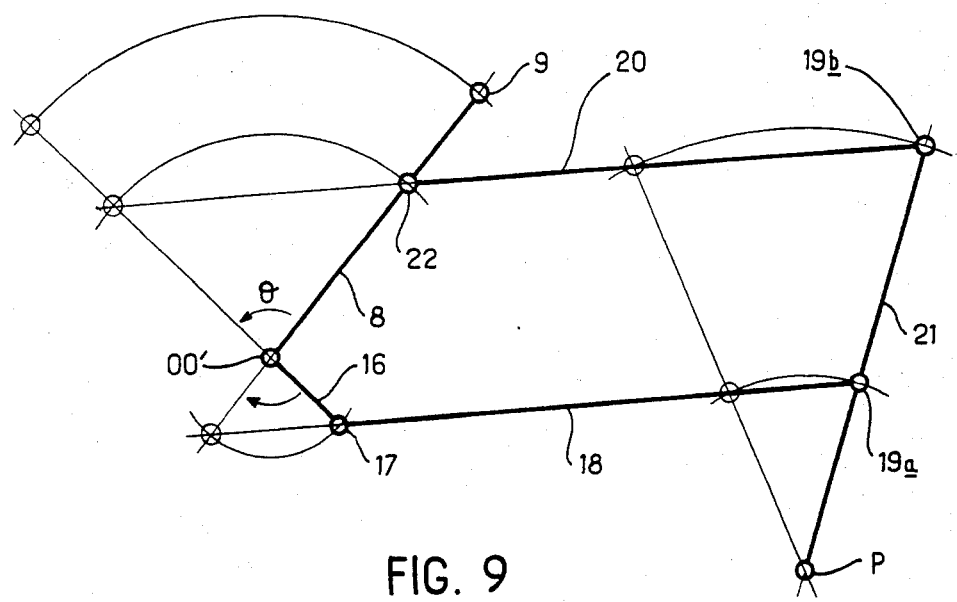
FIGS. 9 and 10 are two Figures also analogous to FIGS. 5 and 6, for a third example of the system wherein the two reversing bars are articulated at two different points on the idler.
Figure 10:
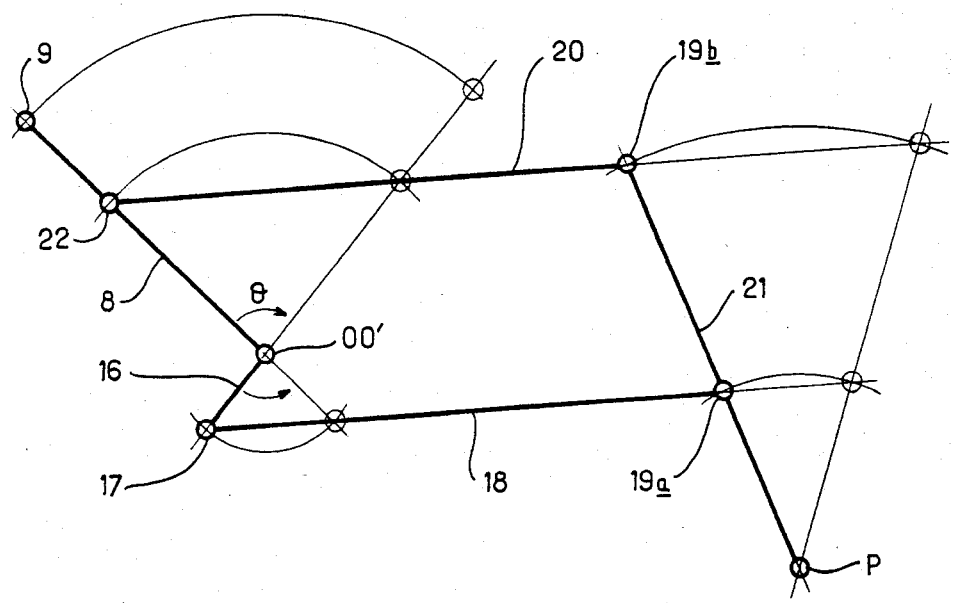

In FIGS. 9 and 10, there have been represented in an analogous manner, the two extreme positions of a final example of an embodiment wherein the two reversing links 18 and 20 are articulated on idler 21 by two distinct pins 19a and 19b which are, in this case, aligned with the fixed axis of articulation P on the vehicle, the idler 21 being schematically outlined as a rectilinear element. In this case too, pins 17 and 22 are displaced along two concentric circles centred on axis 00' and with different radii, in the same way as the two pins 19a and 19b are displaced over two concentric circles centred on axis P and with different radii. Moreover, the two reversing links 18 and 20 have the same length or rather the distances separating the pins 17 and 19a on the one hand and the pins 19b and 22 on the other hand, are equal.

The two extreme positions of these pins are also determined by the intersections of the two above-mentioned pairs of concentric circles with the extension of the reversing links 18 and 20.

In the embodiments wherein the two articulation pins 19a and 19b for the two reversing links 18 and 20 on idler 21 are distinct, if there is parity of on the one hand the distances separating the axis 00' from pins 17 and 22, and of on the other hand the distance separating the pins 22 and 19b, with the distance separating pins 17 and 19b, and with the distance separating axis 00' from axis P, one obtains analogous conditions without jamming at the extreme positions of the elements, if the product of the distance separating axis 00' from axis P multiplied by sin $\alpha$, where $\alpha$ is the angle defined by the segments P 19a and P 19b, is equal to the product of the distance separating axis 00' from pin 22 multiplied by 2 cos $\theta/2$ where $\theta$ is the wiping angle.

It shall be duly understood that the systems described above may give rise to any desirable modifications without thereby departing from the scope of the invention.

I claim:

1. In a windscreen wiper system for a motor vehicle comprising:
   (a) windscreen wiper blade means;
   (b) blade holder arm means for driving said windscreen wiper blade means in an alternating wiping movement in relation to the windscreen surface to be wiped;
   (c) intermediary connecting means articulated to the windscreen wiper blade means and to the blade holder arm means;
   (d) first shaft means having a first axis of rotation and having said blade holder arm means fixed thereto for rotation around said first axis of rotation;
   (e) driving crank means for transmitting drive to said first shaft means for executing alternating rotation around said first axis of rotation;
   (f) actuator arm means having a first end articulated to the intermediary connecting means for actuating displacement of the intermediary connecting means in relation to the blade holder arm means;
   (g) actuator crank means articulated to a second end of said actuator arm means;
   (h) second shaft means rotatable about a second axis of rotation, said second shaft means having said actuator crank means fixed thereto for rotation about said second axis;
   (i) linkage means drivingly connecting the driving crank means and the second shaft means so that any point along said windscreen wiper blade means follows a non-circular trajectory in the course of wiping rotation of said blade holder arm means;
   the improvement wherein said linkage means comprises
   (j) a driven crank fixed to the second shaft means
   (k) an idler constrained to follow a circular or rectilinear movement;
   (l) first and second reversing links articulated to said idler;
   (m) means articulating said driven crank to said first reversing link; and
   (n) means articulating said second reversing link to the driving crank.

2. A system according to claim 1, wherein the first and second reversing links are articulated to said idler at one and the same point.

3. A system according to claim 1, wherein said first and second reversing links are articulated to said idler at respective different articulation points.

4. A system according to claim 3, wherein the articulation points of the first and second reversing links respectively on the idler are constrained to describe rectilinear parallel trajectories.

5. A system according to claim 3, wherein the articulation points of the first and second reversing links on the idler are constrained to describe circular arcuate trajectories having the same centre and the same finite radius.

6. A system according to claim 5, wherein said idler is constrained to execute a circular movement with a finite radius around a centre of rotation, and the respective articulation points of the first and second reversing links on the idler are aligned on a straight line passing through the centre of rotation of the idler.

7. A system according to claim 1, including a driving link connected to the driving motor and to the driving crank means, said driving crank means thereby actuating said first shaft means for alternating rotation.

8. A system according to claim 1, wherein said first axis of rotation is parallel to the second axis of rotation.

9. A system according to claim 1, wherein said first and second axes are identical, and the second shaft is a sleeve coaxially around the first shaft and free for rotation relative thereto.

10. A system according to claim 9, wherein the points of articulation of the first and second reversing links to the idler are different and wherein the means articulating the first and second reversing links respectively on the driven crank means and on the driving crank means are situated on either side of the plane which passes through the common axis of rotation of the first and second shafts and through a point mid-way between the articulation points of the two reversing links on the idler so that the travel of the driving crank and that of the driven crank are effected in opposite directions.

11. A system according to claim 9, wherein the distance separating the common axis of rotation of the two shafts from the means articulating the first reversing link on the driven crank means is equal to the distance separating this same common axis from the means articulating the second reversing link on the driving crank.

12. A system according to claim 9, wherein the distance separating the articulation points of the first reversing link on the idler from the means articulating the first reversing link on the driven crank means is equal to the distance separating the articulation point of the second reversing link on the idler from the means articulating the second reversing link on the driving crank means.

13. A system according to claim 9, wherein the distance separating the articulations point of the second reversing link on the idler from the means articulating the second reversing link to the driving crank means is equal to the distance separating the common axis of rotation from the centre of rotation around which the idler is constrained for its circular motion.

14. In a windscreen wiper system for a motor vehicle comprising:
(a) windscreen wiper blade means;
(b) blade holder arm means for driving said windscreen wiper blade means in an alternating wiping movement in relation to the windscreen surface to be wiped;
(c) intermediary connecting means articulated to the windscreen wiper blade means and to the blade holder arm means;
(d) first shaft means having a first axis of rotation and having said blade holder arm means fixed thereto for rotation around said first axis of rotation;
(e) driving crank means for transmitting drive to said first shaft means for executing alternating rotation around said first axis of rotation;
(f) actuator arm means having a first end articulated to the intermediary connecting means for actuating displacement of the intermediary connecting means in relation to the blade holder arm means;
(g) actuator crank means articulated to a second end of said actuator arm means;
(h) second shaft means rotatable about a second axis of rotation, said second shaft means having said actuator crank means fixed thereto for rotation about said second axis;
(i) linkage means drivingly connecting the driving crank means and the second shaft means so that any point along said windscreen wiper blade means follows a non-circular trajectory in the course of wiping rotation of said blade holder arm means;
the improvement wherein said linkage means comprises
(j) a driven crank fixed to the second shaft means
(k) an idler constrained to follow a circular or rectilinear movement;
(l) first and second reversing links articulated to said idler at a common point;
(m) means articulating said driven crank to said first reversing link; and
(n) means articulating said second reversing link to the driving crank;
(o) a driving link connected to the driving motor and to the driving crank means, said driving crank means thereby actuating said first shaft means for alternating rotation; wherein said first and second axes are identical and the second shaft is a sleeve coaxially around the first shaft and free for rotation relative thereto; and wherein the distance separating the common axis of rotation of the two shafts from the means articulating the first reversing link on the driven crank means is equal to the distance separating this same common axis from the means articulating the second reversing link on the driving crank means; wherein the distance separating the articulation points of the first reversing link on the idler from the means articulating the first reversing link on the driven crank means is equal to the distance separating the articulation point of the second reversing link on the idler from the means articulating the second reversing link on the driving crank means; wherein the distance separating the articulation point of the second reversing link on the idler from the means articulating the second reversing link to the driving crank means is equal to the distance separating the common axis of rotation from the centre of rotation around which the idler is constrained for its circular motion; and wherein the distance separating the articulation point of the second reversing link on the idler from the means articulating the second reversing link to the driving crank means is equal to the product of the distance separating the common axis of rotation of the first and second shaft means from the means articulating the second reversing link to the driving crank means multiplied 2 cos $\theta/2$, where $\theta$ is the wiping angle of the windscreen wiper blade means.

15. In a windscreen wiper system for a motor vehicle comprising:
(a) windscreen wiper blade means;
(b) blade holder arm means for driving said windscreen wiper blade means in an alternating wiping movement in relation to the windscreen surface to be wiped;
(c) intermediary connecting means articulated to the windscreen wiper blade means and to the blade holder arm means;
(d) first shaft means having a first axis of rotation and having said blade holder arm means fixed thereto for rotation around said first axis of rotation;
(e) driving crank means for transmitting drive to said first shaft means for executing alternating rotation around said first axis of rotation;
(f) actuator arm means having a first end articulated to the intermediary connecting means for actuating displacement of the intermediary connecting means in relation to the blade holder arm means;
(g) actuator crank means articulated to a second end of said actuator arm means;
(h) second shaft means rotatable about a second axis of rotation, said second shaft means having said actuator crank means fixed thereto for rotation about said second axis;
(i) linkage means drivingly connecting the driving crank means and the second shaft means so that any point along said windscreen wiper blade means follows a non-circular trajectory in the course of wiping rotation of said blade holder arm means;

the improvement wherein said linkage means comprises (j) a driven crank fixed to the second shaft means (k) an idler constrained to follow a circular or rectilinear movement;

(1) first and second reversing links articulated to said idler at spaced points therealong;

(m) means articulating said driven crank to said first reversing link; and (n) means articulating said second reversing link to the driving crank;

(o) a driving link connected to the driving motor and to the driving crank means, said driving crank means thereby actuating said first shaft means for alternating rotation; wherein said first and second axes are identical and the second shaft is a sleeve coaxially around the first shaft and free for rotation relative thereto; and wherein the distance separating the common axis of rotation of the two shafts from the means articulating the first reversing link on the driven crank means is equal to the distance separating this same common axis from the means articulating the second reversing link on the driving crank means; wherein the distance separating the articulation points of the first reversing link on the idler from the means articulating the first reversing link on the driven crank means is equal to the distance separating the articulation point of the second reversing link on the idler from the means articulating the second reversing link on the driving crank means; wherein the distance separating the articulation point of the second reversing link on the idler from the means articulating the second reversing link to the driving crank means is equal to the distance separating the common axis of rotation from the centre of rotation around which the idler is constrained for its circular motion; and wherein the product of the distance separating the common axis of the first and second shaft means from the means articulating the second reversing link to the driving crank multiplied by $2 \cos \theta/2$, where $\theta$ is the wiping angle of the windscreen wiper blade means, is equal to the product of the distance separating the articulation point of the second reversing link on the idler from the means articulating the second reversing link to the driving crank means multiplied by $\sin \alpha$, where $\alpha$ is the angle subtended by the two articulation points of the first and second reversing links on the idler at the centre of rotation of the idler.

16. A system according to claim 9, wherein the driven crank means and the actuator crank means for the intermediary connecting means are adjustable on the second shaft means to allow variation of their angular position with respect to each other.

17. A system according to claim 2, wherein the idler is articulated around a fixed point of the vehicle which constitutes the centre of the circular arc described by the common articulation point of the reversing links to the idler, and wherein the movement of the idler around the fixed point of the vehicle is actuated by the second reversing link.

18. A system according to claim 1, wherein the idler is guided by a circular slide fixed to the vehicle.

19. A system according to claim 1, wherein the idler is guided by a rectilinear slide fixed to the vehicle.

* * * * *